(12) United States Patent
Wisler et al.

(10) Patent No.: US 7,145,473 B2
(45) Date of Patent: Dec. 5, 2006

(54) ELECTROMAGNETIC BOREHOLE TELEMETRY SYSTEM INCORPORATING A CONDUCTIVE BOREHOLE TUBULAR

(75) Inventors: Macmillan M. Wisler, Kingwood, TX (US); Hugh E. Hall, Jr., Huntsville, TX (US); Denis Weisbeck, Spring, TX (US)

(73) Assignee: Precision Drilling Technology Services Group Inc., Calgary (CA)

( * ) Notice: Subject to any disclaimer, the term of this patent is extended or adjusted under 35 U.S.C. 154(b) by 49 days.

(21) Appl. No.: 10/649,431

(22) Filed: Aug. 27, 2003

(65) Prior Publication Data

US 2005/0046587 A1  Mar. 3, 2005

(51) Int. Cl.
*G01V 3/00* (2006.01)

(52) U.S. Cl. .............................. 340/854.3; 340/854.4; 175/40; 367/82

(58) Field of Classification Search .............. 340/854.3, 340/854.4; 367/82; 175/40
See application file for complete search history.

(56) References Cited

U.S. PATENT DOCUMENTS

| | | | |
|---|---|---|---|
| 4,181,014 A | 1/1980 | Zuvela et al. | |
| 4,578,675 A | 3/1986 | Machleod | |
| 4,684,946 A | 8/1987 | Issenmann | |
| 4,770,034 A | 9/1988 | Titchener et al. | |
| 4,855,732 A * | 8/1989 | Cretin et al. .............. | 340/854.9 |
| 5,163,714 A | 11/1992 | Issenmann | |
| 5,394,141 A | 2/1995 | Soulier | |
| 5,914,911 A * | 6/1999 | Babour et al. ................ | 367/82 |
| 5,945,923 A | 8/1999 | Soulier | |
| 6,041,872 A * | 3/2000 | Holcomb ...................... | 175/40 |
| 6,392,561 B1 | 5/2002 | Davies et al. | |
| 6,531,871 B1 | 3/2003 | Hay et al. | |
| 6,628,206 B1 | 9/2003 | Soulier | |

FOREIGN PATENT DOCUMENTS

EP   1035299 A2   9/2000

OTHER PUBLICATIONS

Peter Brett, Denis Weisbeck, Robert Graham; Innovative Technology Advances Use of Electromagnetic MWD Offshore in Southern North Sea; IADC/SPE 81628 Technical Paper, Presented at the IADC/SPE Underbalanced Technology Conference & Exhibition held in Houston, TX, Mar. 25-26, 2003.
Search Report—GB0417541.0.

* cited by examiner

*Primary Examiner*—Albert K. Wong
(74) *Attorney, Agent, or Firm*—Patrick H. McCollum

(57) ABSTRACT

An electromagnetic borehole telemetry system for transmitting information between a borehole transceiver and a surface transceiver located at or near the surface of the earth. Tubulars, such as steel casing and liners, are typically set within the well borehole to stabilize the wall of the borehole and to assist in hydraulically isolating penetrated formations. The invention utilizes these tubulars cooperating with one or more signal wires to reduce attenuation and noise in signals transmitted between the borehole and surface transceivers. The one or more signal wires are typically disposed within an annulus formed by the borehole wall and the outside surface of the casing. The one or more signal wires are connected at one end to one or more connection terminals positioned preferably near the bottom a tubular string. Opposing ends of the one or more signal wires are connected to one or more terminals of the surface transceiver. By minimizing signal attenuation and noise, the telemetry system can be effectively used at greater depths in the borehole. The telemetry system can be embodied in a measurement-while-drilling system, a formation testing system, a production monitoring system and other system requiring communication between a downhole assembly and the surface of the earth.

51 Claims, 4 Drawing Sheets

ELECTROMAGNETIC BOREHOLE TELEMETRY SYSTEM INCORPORATING A CONDUCTIVE BOREHOLE TUBULAR

This invention is directed toward electromagnetic borehole telemetry system for transmitting information between a borehole transceiver and a transceiver at or near the surface of the earth. More specifically, the invention is directed toward an electromagnetic telemetry system which uses a signal wire cooperating with conductive tubular within the borehole to reduce signal attenuation and enhance signal to noise ratio thereby increasing the depth within the borehole at which the telemetry system can operate efficiently. The borehole transceiver cooperates with one or more sensors, and is typically disposed in a downhole assembly used to drill a borehole, to measure drilling and formation parameters, to test potential of a well borehole penetrating a hydrocarbon bearing formation, or to monitor production of a hydrocarbon or other fluid producing well.

BACKGROUND OF THE INVENTION

The creation of a hydrocarbon producing well can be broadly classified in three stages. The first stage includes the drilling of the well borehole, where it is desirable to measure properties of earth formations penetrated by the borehole and to steer the direction of the borehole while drilling. The second stage includes testing of formations penetrated by the borehole to determine hydrocarbon content ad producability. The third stage includes monitoring and controlling production typically throughout the life of the well. Operations in all stages typically employ a downhole assembly that contains one or more sensors responsive to stage related drilling, formation, or production parameters of interest Response data from the one or more sensors are telemetered to the surface of the earth and received by a second transceiver for processing and interpretation. Conversely, it is desirable to transmit data via the surface transceiver to the borehole transceiver to control stake related drilling, testing or production operations.

In many of the stage operations discussed above, it is not operationally feasible to use a "hard wire" communication link, such as one or more electrical or fiber optic conductors, between the borehole transceiver and the surface transceiver. When wire communication links are not feasible, electromagnetic (EM) telemetry systems offer one means for communicating between borehole and surface transceivers. Data transmission rates using EM communication links are typically much lower than those of hard wire communication links. Signal attenuation in EM communication links is typically much higher than that in hard wire communication links, for a given operational depth within a borehole.

As mentioned above, direct or hard wire communication links for data telemetry are often operationally impractical in many well stage operations. This is especially true in the borehole drilling stage, where measures of parameters of formations penetrated by the borehole are of interest. Systems for measuring such geophysical and other parameters within the vicinity of a well borehole typically fall within two categories. The first category includes systems that measure parameters after the borehole has been drilled. These systems include wireline logging, tubing conveyed logging, slick line logging, production logging, permanent downhole sensing devices and other techniques known in the art. Memory type or hard wire communication links are typically used in these systems. The second category includes systems that measure formation and borehole parameters while the borehole is being drilled. These systems include measurements of drilling and borehole specific parameters commonly known as "measurement-while-drilling" (MWD), measurements of parameters of earth formation penetrated by the borehole commonly known as "logging-while-drilling" (LWD), and measurements of seismic related properties known as "seismic-while-drilling" or (SWD). For brevity, systems that measure parameters of interest while the borehole is being drilled will be referred to collectively in this disclosure as "MWD" systems. Within the scope of this disclosure, it should be understood that MWD systems also include logging-while-drilling and seismic-while-drilling systems.

A MWD system typically comprises a downhole assembly operationally attached to a downhole end of a drill string. The downhole assembly typically includes at least one sensor for measuring at least one parameter of interest, control and power elements for operating the sensor, and a borehole transceiver for transmitting sensor response to the surface of the earth for processing and analysis. The downhole assembly is terminated at the lower end with a drill bit. A rotary drilling rig is operationally attached to an upper end of the drill string. The action of the drilling rig rotates the drill string and downhole assembly thereby advancing the borehole by the action of the rotating drill bit. A surface transceiver is positioned remote from the downhole assembly and typically in the immediate vicinity of the drilling rig. The surface transceiver receives telemetered data from the downhole transceiver. Received data are typically processed using surface equipment, and one or more parameters of interest are recorded as a function of depth within the well borehole thereby providing a "log" of the one or more parameters. Hard wire communication links between the borehole and surface transceivers are operationally difficult because the downhole assembly containing the borehole transceiver is rotated typically by the drill string.

In the absence of a hard wire link, several techniques can be used as a communication link for the telemetry system. These systems include drilling fluid pressure modulation or "mud pulse" systems, acoustic systems, and electromagnetic systems.

Using a mud pulse system, a downhole transmitter induces pressure pulses or other pressure modulations within the drilling fluid used in drilling the borehole. The modulations are indicative of data of interest, such as response of a sensor within the downhole assembly. These modulations are subsequently measured typically at the surface of the earth using a receiver means, and data of interest is extracted from the modulation measurements. Data transmission rates are low using mud pulse systems. Furthermore, the signal to noise ratio is typically small and signal attenuation is large, especially for relatively deep boreholes.

A downhole transmitter of an acoustic telemetry induces amplitude and frequency modulated acoustic signals within the drill sting. The signals are indicative of data of interest. These modulated signals are measured typically at the surface of the earth by an acoustic receiver means, and data of interest are extracted from the measurements. Once again, date transmission rate, the signal to noise ratio of the telemetry system is small, and signal attenuation as a function of depth within the borehole is large.

Electromagnetic telemetry systems can employ a variety of techniques. Using one technique, electromagnetic signals are modulated to reflect data of interest. These signals are transmitted from a downhole EM transceiver, through intervening earth formation, and detected using a surface transceiver that is typically located at or near the surface of the earth. Data of interest are extracted from the detected signal. Using another electromagnetic technique, a downhole transceiver creates a current within the drill sting and the current travels along the drill string. This current is typically created by imposing a voltage across a non-conducting section in the downhole assembly. The current is modulated to reflect data of interest. A voltage between the drilling rig and a remote ground is generated by the current and is measured by a transceiver, which is at the surface of the earth. The voltage is usually between a wire attached to the drilling rig or casing at the surface and a wire which leads to a grounded connection remote from the rig. Again, data of interest are extracted from the measured voltage. When data are sent from the surface transceiver to the downhole transceiver, voltage is applied between a point on the rig and a remote ground. This, in turn, creates a current that travels along the drill string and casing, and is detected by the downhole transceiver in the form of a voltage across the non-conducting section of the downhole assembly.

SUMMARY OF THE INVENTION

This present invention is directed toward an electromagnetic (EM) well borehole telemetry system for transmitting information between a "borehole" EM transceiver, disposed preferably within a downhole assembly in the borehole, and a "surface" EM transceiver positioned at or near the surface of the earth. One or more conductive tubulars, such as steel casing and liners, are typically set within the well to stabilize the wall of the borehole and to assist in hydraulically isolating penetrated formations, as is known in the art. The invention utilizes these conductive tubulars within the borehole. Using a string of casing as an example, one or more insulated conductor wires, hereafter referred to as "signal" wires, are preferably disposed within an annulus formed by the borehole wall and the outside surface of the casing. In a preferred embodiment, the one or more signal wires are electrically connected at one end to one or more casing connection terminals, providing an electrode means, positioned preferably near the bottom of the casing string. Opposing ends of the one or more signal wires are connected to one or more signal terminals of the surface EM transceiver. A remote ground wire may or may not be used. In another embodiment, the end(s) of the signal wire(s) is(are) connected to an electrode means that is not electrically connected to the casing but may be conveyed by the casing via a mechanical connection to a point(s) downhole in the annulus between the casing and the borehole wall. This electrode means could be a section of bare wire or a conducting plate which, by contact with the material in the annulus between the casing and the borehole wall, will be at the potential of that same annulus region. In yet another embodiment, the signal wire(s) and electrode means are conveyed by means other that the casing, such as a weighted end to a point(s) downhole in the annulus between the casing ad the borehole wall.

For purposes of initial discussion, assume that only one signal wire is electrically connected between a single casing connector terminal near the bottom of the casing and a single surface EM transceiver terminal. EM transceiver ground is connected to a remote ground by a by a ground wire. In the prior art, the EM signal is attenuated by intervening formation and borehole material between the surface and borehole EM transceivers. By using the signal wire, the transmitted EM signal is significantly attenuated only by intervening formation and borehole material between the borehole EM transceiver and the casing connection terminal located downhole. Because preferably a high impedance voltage measurement is now made at a point downhole on or beside the casing at the electrode means signal attenuation between the casing connection terminal and the surface EM transceiver is essentially eliminated. The high impedance voltage measurement which is preferably made causes very low or negligible current to flow in the signal wire, therefore, there is negligible attenuation within the signal wire. Stated another way, the effective distance between the surface and borehole EM transceivers is reduced. By utilizing the signal wire, overall signal attenuation is reduced significantly compared to attenuation of an EM signal transmitted directly between the borehole EM transceiver and the surface EM transceiver. Electromagnetic noise induced at or near the surface is also minimized since the signal wire is not attached at the surface, but is electrically connected to the casing downhole. In summary, the EM telemetry system is configured to minimize signal attenuation and to enhance signal-to-noise ratio. These features increase the depth within the borehole at which the telemetry system can operate efficiently.

Embodiments of the telemetry system can be varied as will be discussed in detail in subsequent sections of this disclosure. Details of operating principles of the surface and borehole transceivers are disclosed in U.S. Pat. No. 4,684,946 (transmitter) and U.S. Pat. No. 5,394,141 (long dipole antenna), and are hereby entered into this disclosure by reference.

The borehole EM transceiver cooperates with one or more sensors typically disposed in a downhole assembly. The downhole assembly can comprise a MWD element used in the first operational stage of drilling the well borehole. In an alternate embodiment, the downhole assembly can comprise a testing element used in the second operational stage to test potential of a hydrocarbon bearing formation penetrated by the borehole. In yet another alternate embodiment, the downhole assembly can comprise a monitor element used in the third operational stage to monitor production of a hydrocarbon or other fluid producing well. For purposes of disclosure, the EM telemetry system embodied as a MWD telemetry system will be described in detail. It should be understood, however, that the system can be embodied with equal effectiveness in a second stage formation testing system or a third stage well monitoring and production system.

Embodied in a MWD system, the borehole EM transceiver is typically disposed within a downhole assembly that is operationally attached to a downhole end of a drill string. In addition, the downhole assembly typically includes at least one sensor for measuring at least one borehole or formation parameter of interest, control and power elements for operating the sensor and the borehole EM transceiver. The downhole assembly is term ted at the lower end with a drill bit A rotary drilling rig is typically attached to an upper end of the drill string The action of the drilling rig rotates the drill string and downhole assembly thereby advancing the borehole by the action of the attached drill bit. One or more intermediate strings of casing are typically "set" within the borehole as it is advanced by the drill bit. The signal wire is electrically connected at one end to a casing connection terminal, preferably near the bottom of the casing, and at a second end to the face EM transceiver at or relatively near the surface of the earth. A second terminal of the surface EM transceiver is grounded at a point remote from the drilling rig, or alternately electrically connected to another part of the casing. The voltage is measured between these two transceiver inputs. The surface EM transceiver receives telemetered data via the measured voltage, indicative of sensor response, from the borehole EM transceiver. Received data are typically processed using a surface processor and converted to well borehole or formation parameters of interest. Data can also be transmitted from the surface to the downhole assembly via the surface EM transceiver, Parameters of interest are recorded at the surface as a function of depth within the well borehole thereby providing a "log" of the parameters of interest. As discussed previously, a hard wire communication link directly connecting the borehole and surface EM transceivers is operationally difficult because the downhole assembly containing the borehole transceiver is rotated typically by the drill string.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

This present invention is directed toward an electromagnetic (EM) borehole telemetry system for transmitting information between a "borehole" EM transceiver, disposed preferably within a downhole assembly in the borehole, and a "surface" EM transceiver at or near the surface of the earth. It is noted that the "surface" EM transceiver need not be located on the surface of the earth, but it is always disposed above or "up-hole" with respect to the borehole EM transceiver.

Figure 1:
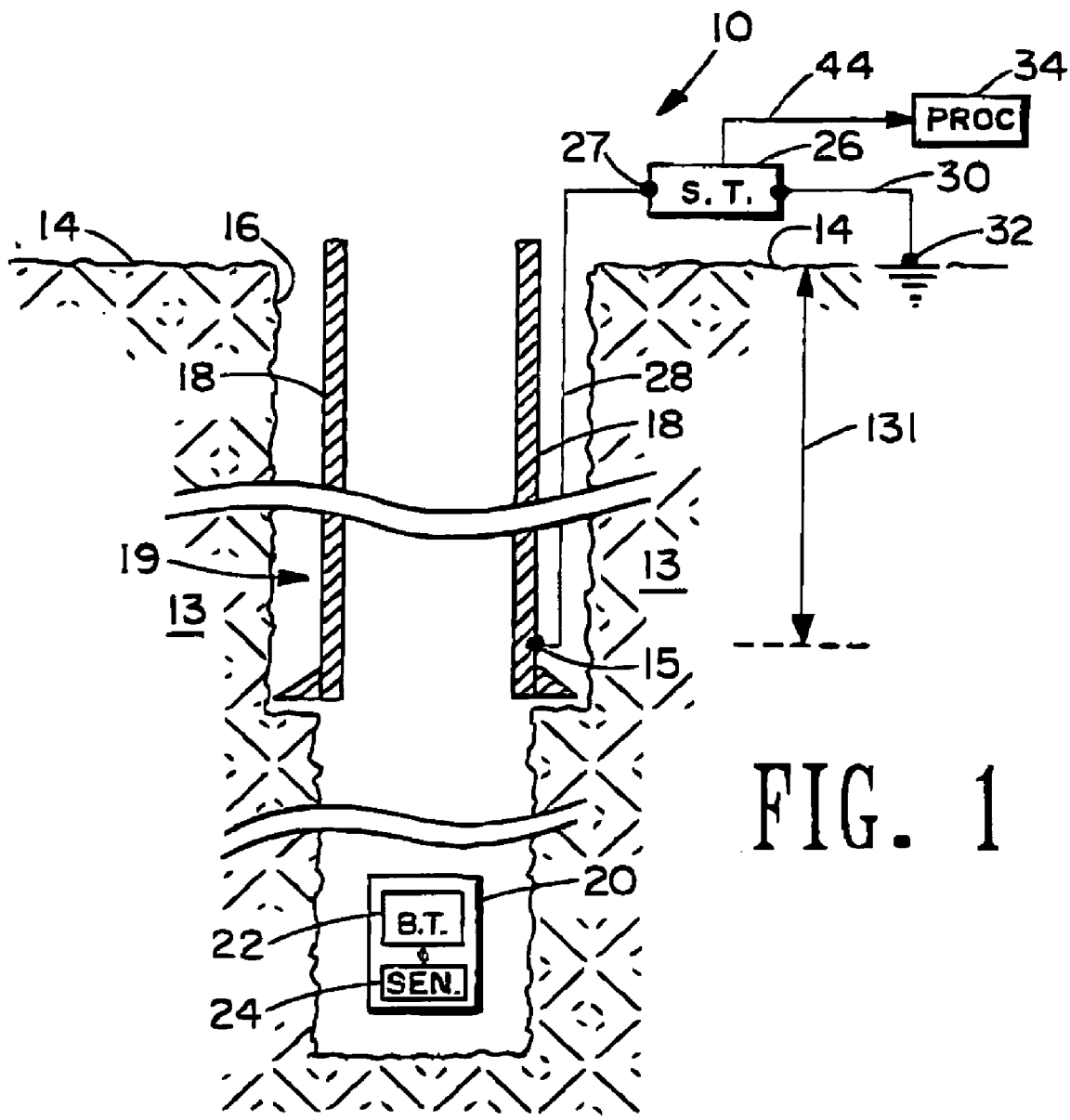
FIG. 1 is a conceptual illustration of the basic elements of the invention.

FIG. 1 is a conceptual illustration of the basic elements of the invention, which is identified as a whole by the numeral 10. The system 10 operates at a low frequency, typically in the frequency range less than 100 Hertz (Hz). A string of conductive tubular, such as steel casing, is shown disposed within a borehole 19 penetrating earth formation 13. Although only a single string of tubular 18 is shown, it should be understood that the methods and apparatus of the invention arm equally applicable to boreholes containing two or more concentric string of tubulars such as casings, liners, screens and the like. A downhole assembly 20 is sown disposed within the borehole 19 below the tubular stung 18. The downhole assembly comprises a borehole EM transceiver 22, which is typically connected operationally to at least one sensor 24. The downhole assembly 20 can comprise a MWD element, wherein the one or more sensors 24 respond to formation and borehole parameters. In an alternate embodiment, the downhole assembly 20 can comprise a testing element, wherein the one or more sensors 24 respond to the potential of a hydrocarbon bearing formation penetrated by the borehole 19. In yet another alternate embodiment, the downhole assembly 20 can comprise one or more sensors 24 used to monitor production of a hydrocarbon or other fluid produced from the formation 13. It should be understood that the downhole assembly 20 can be embodied to measure or monitor additional parameters associated with the drilling, completion and production of the well borehole 19.

Still referring to FIG. 1, a signal wire 28 is shown disposed within an annulus defined by the outer surface of the tubular 18 and the wall 16 of the borehole 19. The signal wire is electrically connected at one end to a casing connection terminal 15 positioned preferably near the bottom of the tubular string 18. The opposing end of the signal wire 28 is electrically connected to a terminal 27 of a surface EM transceiver 26 disposed at or near the surface 14. If two or more strings of tubulars are used, the signal wire 28 can be disposed within an annulus defined by two strings of tubulars Alternately, the signal wire can be disposed inside the inner most sting of tubular.

It is noted that the connection of the signal wire 28 at casing connection terminal 15 can be a physical electrical or mechanical connection. Examples of physical connections include, but are not limited to, a bolt that connects the signal wire 28 directly to the casing, a flange welded to the casing and to which the signal wire is bolted, a flange welded to the casing and to which the signal wire is welded, a weld connecting the signal wire directly to the casing. Alternately the connection can be an electrode means in contact with the material between the casing and the borehole wall which is not connected to the casing.

Again referring to FIG. 1, electromagnetic signals, typically indicative of the response of the one or more sensors 24, are transmitted from the borehole EM transceiver 22 to the surface EM transceiver 26. Conversely, control or other signals are transmitted from the surface EM transceiver 26 to the borehole EM transceiver 22. The casing 18 alters the path of an EM signal transmitted between the surface EM transceiver 26 and borehole EM transceiver 22. By using the signal wire 28, the transmitted EM signal is significantly attenuated only by intervening formation and borehole material between the borehole EM transceiver 22 and the casing connection terminal 15. Signal attenuation between the casing connection terminal 15 and the surface EM transceiver 26 is essentially eliminated since signal attenuation within the signal wire is negligible because current within the wire is minimal. The "effective" distance between the surface EM transceiver 26 and borehole EM transceiver 22 is reduced by a distance indicated by the numeral 131.

Once again referring to FIG. 1, the surface EM transceiver 26 is grounded by a ground wire 30 at a ground point 32 which is remote as practical from the well borehole 19. The surface EM transceiver 26 is responsive to voltage between the casing connection 15 and the ground point 32. Signals from the one or more sensors 24 are received by the surface EM transceiver 26 and are transmitted by a link 44 to a processor 34. The processor converts these signals into parameters of interest. The processor 34 also provides power for the surface EM transceiver 26 and means to input control signs to be telemetered via the surface EM transceiver to the borehole EM transceiver 22. Control signals are sensed as voltages measured using the borehole EM transceiver 22.

By utilizing the signal wire 28 as illustrated in FIG. 1, overall signal attenuation is reduced significantly compared to attenuation of an EM signal transmitted directly between the borehole EM transceiver 22 and the surface EM transceiver 26. In summary, the EM telemetry system is configured to minimize signal attenuation and to enhance signal-to-noise ratio thereby increase the depth within the borehole 19 at which the telemetry system 10 can operate efficiently.

Figure 2:
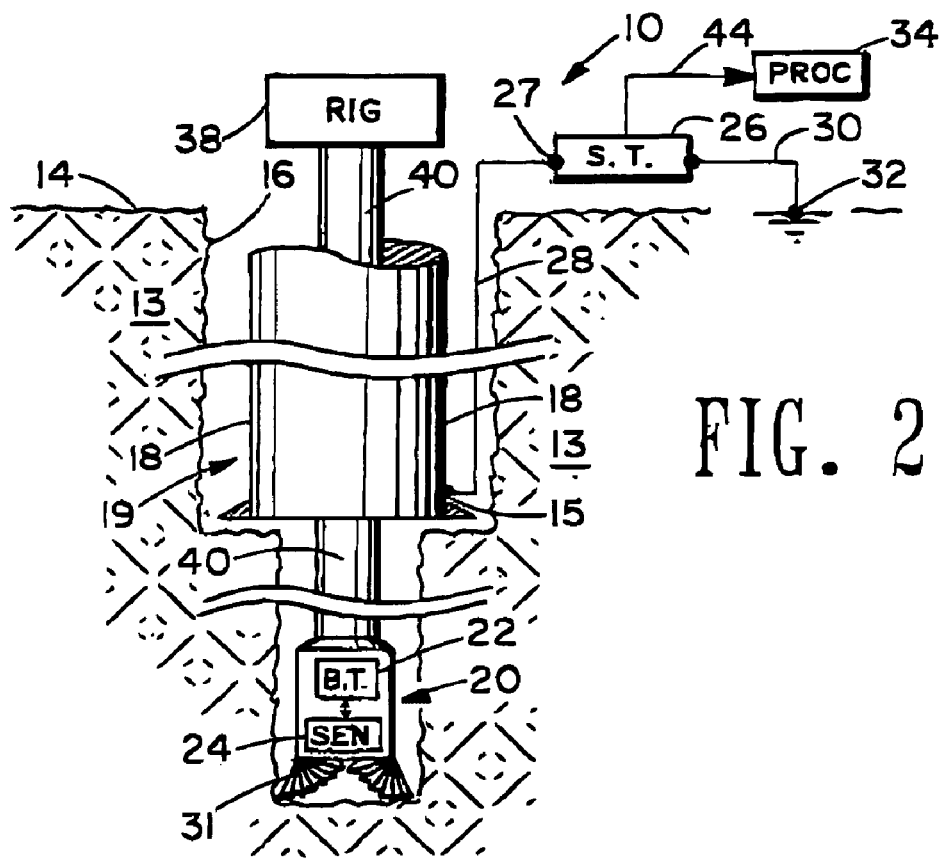
FIG. 2 shows the EM telemetry system embodied in a MWD system.

FIG. 2 illustrates the EM telemetry system 10 embodied in a MWD system The borehole EM transceiver 22 is disposed within a downhole assembly 20 that is operationally attached to a downhole end of a drill string 40. In addition, the downhole assembly 20 typically includes at least one sensor 24 for measuring at least one parameter of the formation 13 or a drilling parameter, control and power elements (not shown) for operating the sensor 24 and the borehole EM transceiver 22. The downhole assembly 20 is terminated at the lower end with a drill bit 31. A rotary drilling rig 38, which is well known in the art, is typically attached to an upper end of the drill string. The action of the drilling rig 38 typically rotates the drill string 40 and downhole assembly 20 with attached drill bit 31 thereby advancing the borehole 19. Intermediate strings of casing are typically "set" within the borehole 19 as it is advanced by the drill bit 31. One such string of casing 18 is illustrated, with the drill string 40 traversing the inside of the casing. A signal wire 28 is attached at one end to a casing connection terminal 15, preferably near the bottom of the casing 18, and at a second end to a terminal 27 of the surface EM transceiver 26 which is positioned at or relatively near the surface 14 of the earth. The surface EM transceiver 26 receives telemetered data, indicative of response of the one or more sensors 24, from the borehole EM transceiver 22. The surface EM transceiver 26 is again grounded at a remote point 32 by a ground wire 30. Received data are transferred by link 44 to a surface processor 34, where these data are converted to well borehole or formation parameters of interest. Data can also be to transmitted from the surface to the downhole assembly 20 via the surface EM transceiver 26. Parameters of interest are recorded at the surface as a Action of depth within the well borehole thereby providing a "log" of the one or more parameters of interest.

Figure 3:
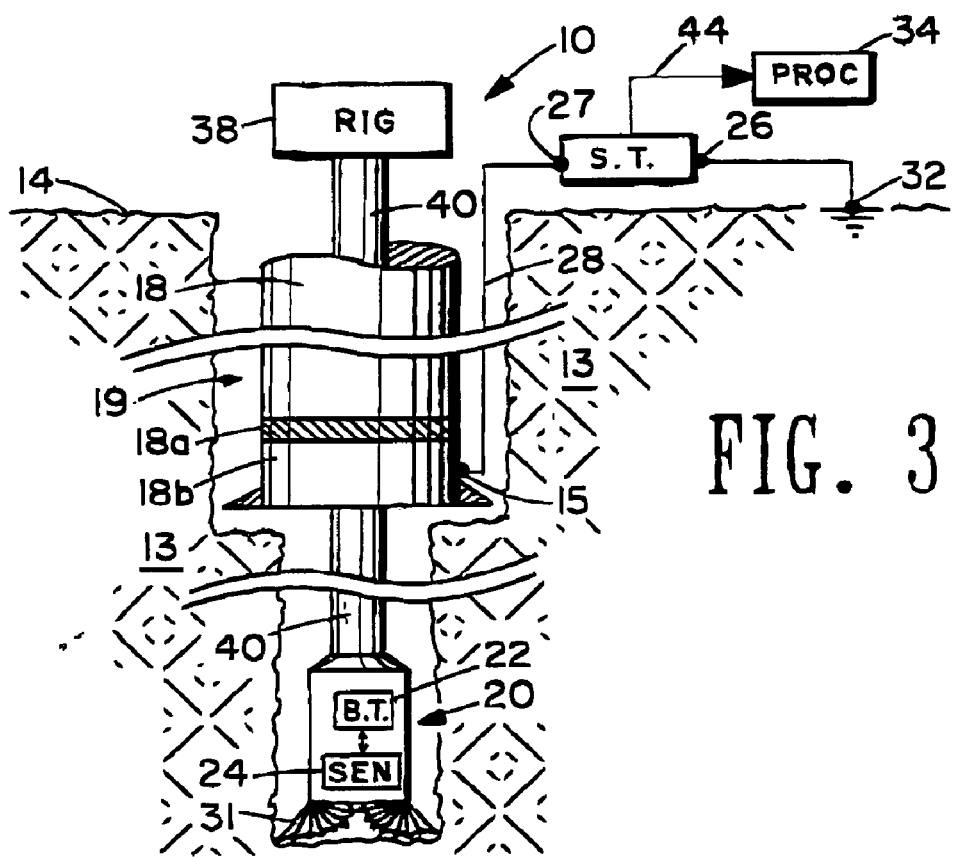
FIG. 3 shows the EM telemetry system again embodied in a MWD system, but with the lower end of the signal wire connected to an electrode which is electrically insulated from the casing.

FIG. 3 shows the EM telemetry system 10 again embodied in a MWD s The embodiment is similar to the embodiment show in FIG. 2, except that the lower end of the of the signal wire 28 is attached at casing connection terminal 15 to an electrode structure 18b which is insulated from the casing 18 by a section or "joint" of non conducting casing 18a. Using this embodiment, the electrode structure 18b is closer to the potential of the casing or the drill string 40 immediately inside the casing thereby reducing filer the attenuation of EM signals between the borehole EM transceiver 22 and the surface EM transceiver 26. Details of the use of a non conducting joint of casing in an EM telemetry system are disclosed in U.S. Pat. No. 5,163,714, which is hereby entered into this disclosure by reference. Other elements shown in FIG. 3 are functional the same as corresponding elements shown and discussed in FIG. 2.

Figure 4:
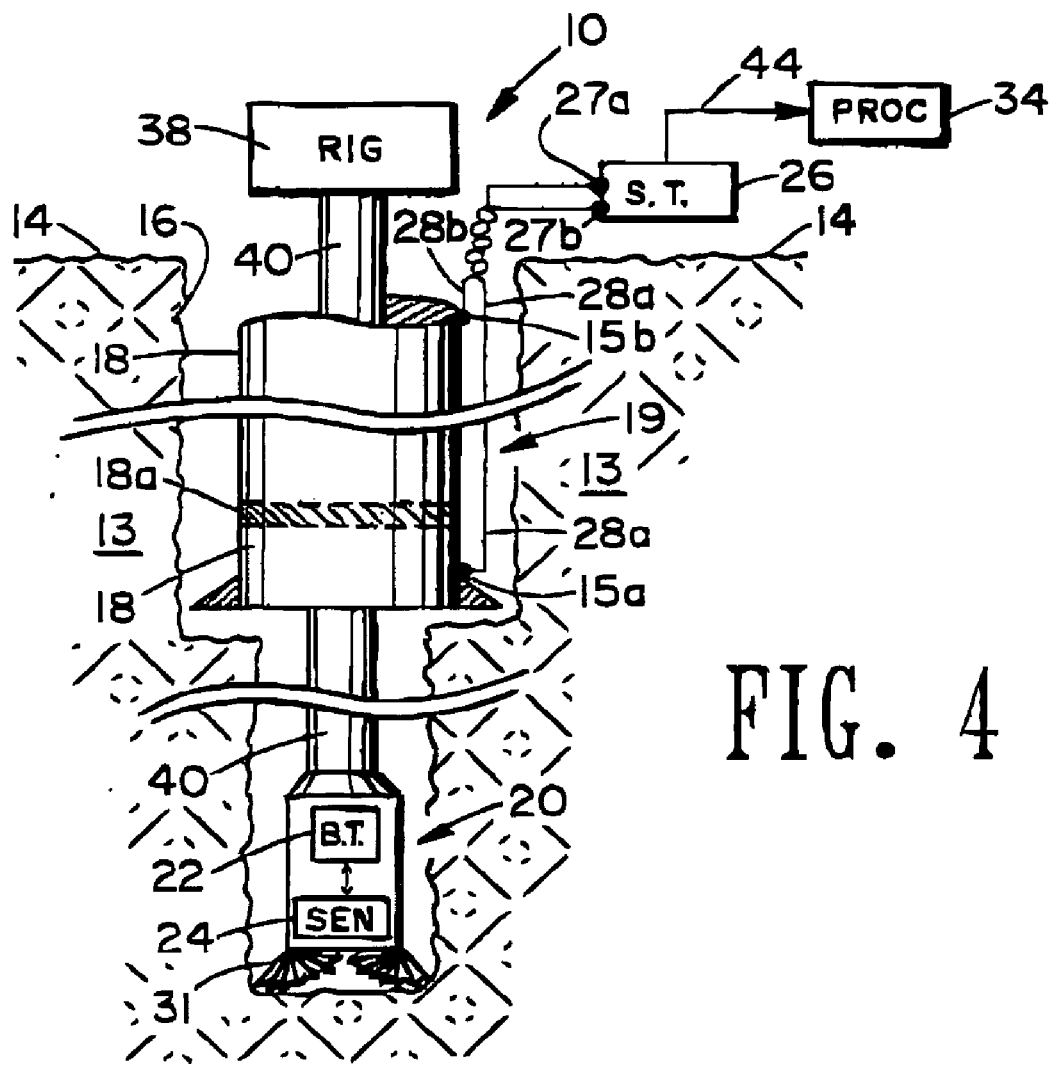
FIG. 4 shows the FM telemetry system once again embodied in a MWD system that employs two signal wires.

FIG. 4 shows the EM telemetry system 10 once again embodied in a system. The embodiment is similar to those shown and discussed in FIGS. 2 and 3, except that two signal wires are employed A first signal wire 28a is attached at one end to a casing connection terminal 15a, again preferably near the bottom of the casing 18, and at a second end to a terminal 27a of the surface EM transceiver 26 at the surface 14 of the earth. A second signal wire 28b is attached at one end to a casing connection terminal 15b, which is axially spaced above the casing connection terminal 15a on the casing 18, and at a second end to terminal 27b of the surface EM transceiver 26. Using this arrangement, signals input into the surface EM transceiver 26 are dependent, only upon EM signals generated in the casing by the borehole EM transceiver 22. The ground wire 30 shown in embodiments of FIGS. 2 and 3 is not required. Any surface noise between a remote ground (see 32 in FIGS. 2 and 3) and the surface EM transceiver 27 is, therefore, eliminated. The non-conducting joint 18a, illustrated with broken lines, is optional in this embodiment of the system. Other elements shown in FIG. 4 are functional the same as corresponding elements shown and discussed in FIGS. 2 and 3. The two signal wires going from the connection 28b and the terminal 27 of the surface EM transceiver 26 are preferably a twisted pair or a coaxial cable.

All signal wires 28, 28a and 28b am preferably rugged to withstand rough operations conditions and harsh borehole conditions. Armored wireline cable meets such requirements.

Figure 5:
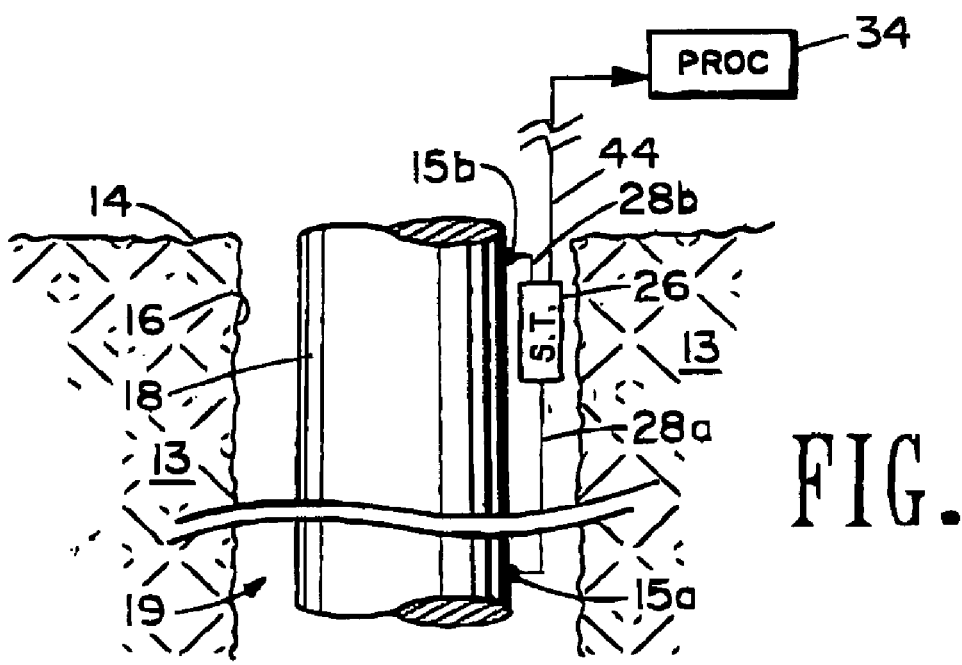
FIG. 5 shows the EM telemetry system employing two signal wires wherein the surface EM transceiver is disposed within the annulus defined by the outer surface of casing and the wall of the borehole.

FIG. 5 shows yet another embodiment of the EM telemetry system 10. This embodiment can be used in conjunction with a MWD system, but elements of the drilling rig have been omitted for purposes of clarity. This embodiment, as well as previously discussed embodiments, can also be used in conjunction with formation testing systems and production monitoring systems. The two signal wire embodiment is similar to that shown in FIG. 4, except that the surface EM transceiver 26 has also been disposed within the annulus defined by the outer He of the casing 18 and the wall 16 of the borehole 19. In this embodiment, power and control signals are supplied from the processor 34 to the surface EM transceiver 26 via the link 44. Signals received by the surface EM transceiver 26 are transmitted to the processor 34 via the link 44. Data transmitted to the borehole EM transceiver 22 are first transmitted from the processor 34 to the surface EM transceiver 26 via the link 44. This embodiment further reduces surface noise by processing the telemetry signals in an electrically "quiet" environment of the borehole 19 rather than at the surface 14.

Figure 6:
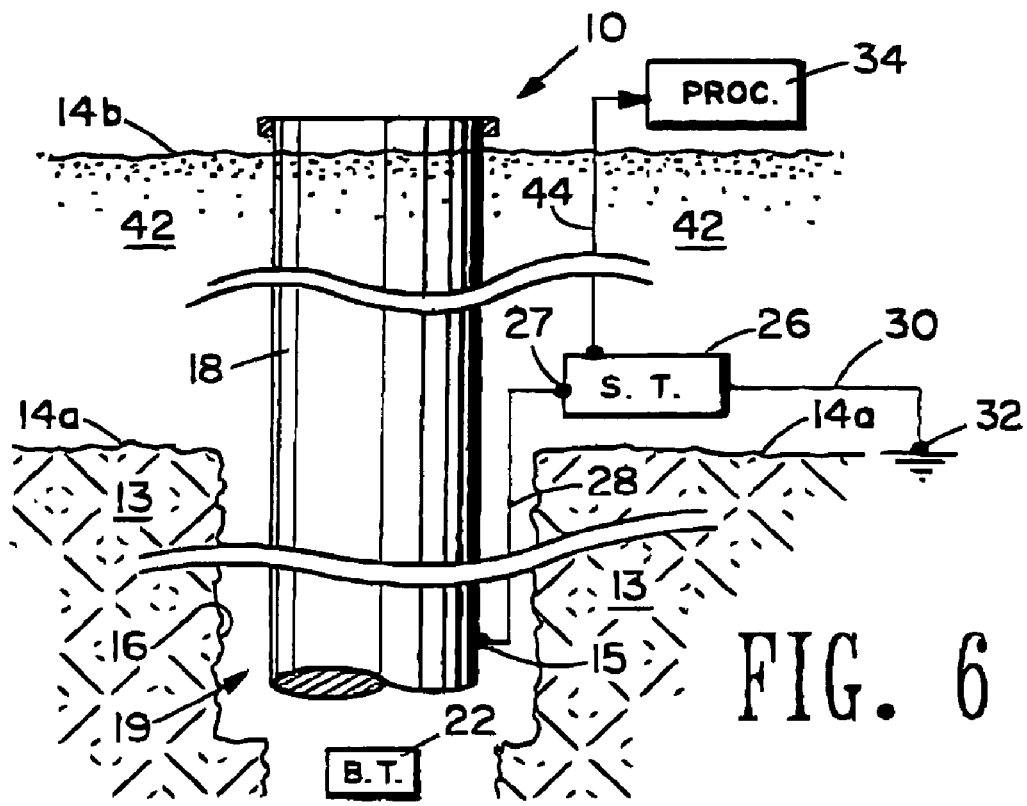
FIG. 6 shows an offshore embodiment of the EM telemetry system wherein the surface EM transceiver is located beneath a body of water.

FIG. 6 shows an offshore embodiment of the EM telemetry system 10 that is similar to the land embodiment of the system shown in FIG. 2. Again, this embodiment can be used in conjunction with a MWD system, but elements of the drilling rig have been omitted for purposes of clarity. This embodiment can also be used in conjunction with formation testing systems and production monitoring systems discussed previously. The surface EM transceiver 26 is located on or near a surface 14a, which lies beneath a body of water 42. A tubular string, such as casing 18, extends from the surface 14b of the water body 42 into a borehole 19 penetrating earth formation 13 beneath the water. A signal wire 28 disposed in an annulus defined by the surface of the casing 18 and the borehole wall 16. One end of the signal wire 28 is again attached to a casing connection terminal 15, preferably near the bottom of the casing 18, and at a second end to a terminal 27 of the surface EM transceiver 26. The surface EM transceiver 26 is disposed at or relatively near the earth spice 14a beneath the body of water 42. Once again, the surface EM transceiver 26 receives telemetered data, indicative of response of the one or more sensors (not shown), from the borehole EM transceiver 22. The surface EM transceiver 26 is grounded at a remote, underwater point 32 by a ground wire 30. Data received by the surface EM transceiver 26 are transferred by link 44 to a surface processor 34 disposed above the water surface 14b, where these data are converted to well borehole or formation parameters of interest. Once again, data can be transmitted from the processor 34 to the surface EM transceiver 26 via the link 44, and subsequently to the borehole EM transceiver 22 via previously discussed EM signal transmission. The link 44 also serves as a means for powering and controlling the surface EM transceiver 26.

Figure 7:
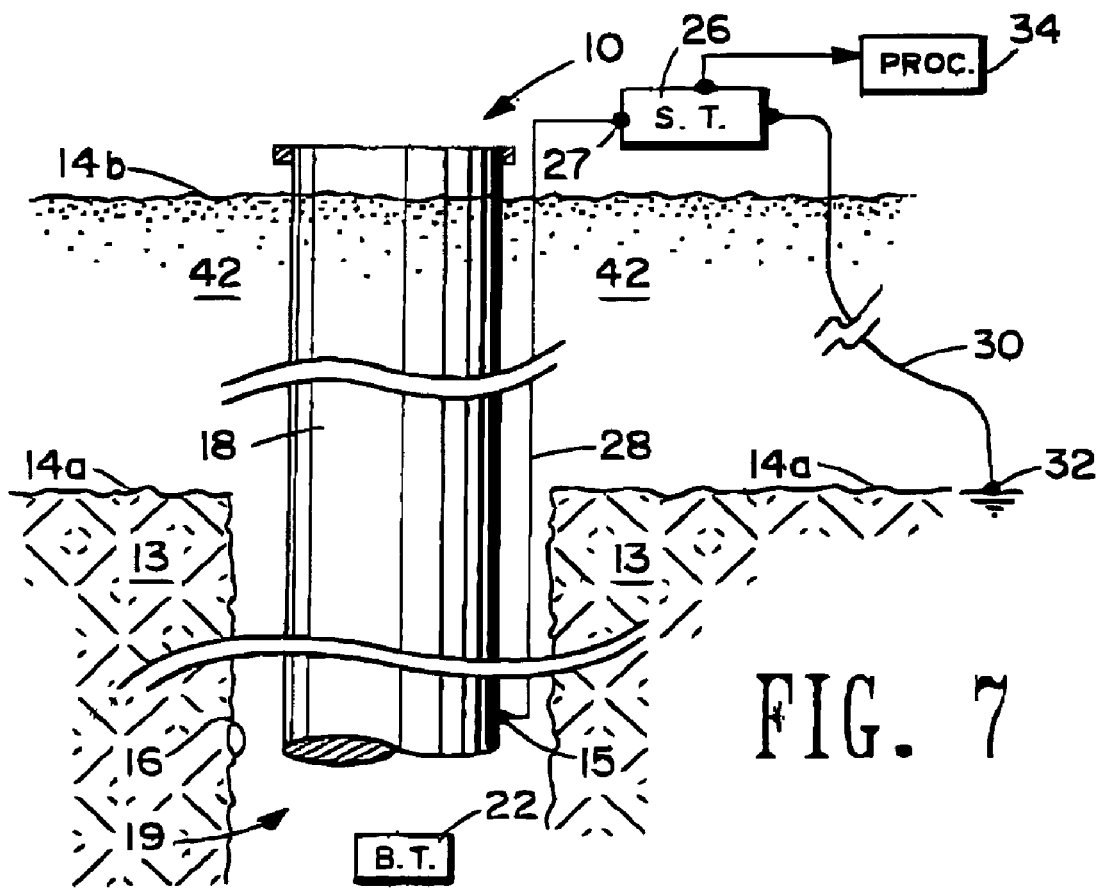
FIG. 7 shows another offshore embodiment of the EM telemetry system that is again similar to the land embodiment of the system shown in FIG. 2, wherein the surface EM transceiver is located above surface of the body of water.

FIG. 7 shows another offshore embodiment of the EM telemetry system 10 that is again similar to the land embodiment of the system shown in FIG. 2. As mentioned previously, this embodiment can be used in conjunction with a MWD system or alternately in conjunction with formation testing systems and production monitoring systems discussed previously. The surface EM transceiver 26 is located above surface 14b of the body of water 42 The casing 18 again extends from the surface 14b of the water body 42 into the borehole 19 penetrating earth formation 13 beneath the water. A signal we 28 traverses the water 42 between the surfaces 14b and 14a, and is then disposed in the annulus defined by the surface of the casing 18 and the borehole wall 16. The signal wire 28 is again attached at one end to a casing connection terminal 15, preferably near the bottom of the casing 18, and at a second end to a terminal 27 of the surface EM transceiver 26. As in previous embodiments, the surface EM transceiver 26 receives telemetered data, indicative of response of the one or more sensors (not shown), from the borehole EM transceiver 22. The surface EM transceiver 26 is grounded at a remote, underwater point 32 by a ground wire 30 that traverses the water body 42. Data transfer between the surface EM transceiver 26 and the borehole EM transceiver 22 has been discussed previously.

Comparing the onshore embodiments of the EM telemetry system 10 shown in FIGS. 6 and 7, positioning the surface EM transceiver 26 beneath the surface 14b of the water reduces noise but introduces some operational difficulties in powering and maintaining the surface EM transceiver under water. Conversely, positioning the surface EM transceiver 26 above the water surface 14b is operationally advantageous, but is more susceptible to nose than the embodiment shown in FIG. 6.

It should be understood that embodiments of the EM telemetry system 10 shown in FIGS. 4 and 5 can also be adapted for offshore operations by combining these embodiments with features shown in the embodiments of FIGS. 6 and 7.

While the foregoing disclosure is directed toward the preferred embodiments of the invention, the scope of the invention is defined by the claims, which follow.

What is claimed is:

1. A telemetry system for transmitting an electromagnetic signal within a borehole, the system comprising:
    (a) a borehole EM transceiver;
    (b) a surface EM transceiver; and
    (c) a signal wire with a first end comprising electrode means connected within said borehole to the outer surface of a tubular, and a second end electrically connected to said surface EM transceiver; wherein
    (d) said signal wire reduces attenuation of said signal transmitted between said surface EM transceiver and said borehole EM transceiver.

2. The telemetry system of claim 1 further comprising a ground wire with a first end electrically connected to said surface EM transceiver and a second end connected to a ground point remote foam said surface EM transceiver.

3. The telemetry system of claim 2 wherein said signal wire is disposed in the annulus between said tubular and the wall of said borehole.

4. The telemetry system of claim 3 wherein said first end of said signal wire is connected near the lower end of said tubular.

5. The telemetry system of claim 3 where said first end of said signal wire is electrically connected to the outer surface of said tubular.

6. The telemetry system of claim 3 where said first end of said signal wire is mechanically connected to the outer surface of said tubular.

7. The telemetry system of claim 3 wherein said surface EM transceiver is positioned above a surface of earth through which said borehole penetrates.

8. The telemetry system of claim 3 wherein:
    (a) earth surface through which said borehole penetrates is covered by a body of water;
    (b) said tubular extends above a surface of said body of water; and
    (c) said borehole EM transceiver is disposed above said earth surface and within said body of water.

9. The telemetry system of claim 3 wherein:
    (a) earth surface through which said borehole penetrates is covered by a body of water;
    (b) said tubular extends above a surface of said body of water; and
    (c) said borehole EM Receiver is disposed above said surface of water.

10. The telemetry system of claim 3 wherein said first end of said signal wire is affixed to an electrode structure that is electrically insulated from said tubular by a non conducting section of tubular.

11. The telemetry system of claim 1 comprising a second signal wire, with a first end comprising electrode means disposed within said borehole axially spaced from said first end of said signal wire and a second end electrically connected to said surface EM transceiver, wherein said signal wire and said second signal wire cooperate to reduce surface noise in said signal.

12. The telemetry system of claim 11 wherein said signal wire and said second signal wire are disposed within an annulus defined by an outer surface of said tubular and the wall of said borehole.

13. The telemetry system of claim 12 wherein said surface EM transceiver is disposed within said annulus.

14. The telemetry system of claim 12 wherein said surface EM transceiver is positioned above earth surface through which said borehole penetrates.

15. A measurement-while-drilling system for measuring a parameter of interest, said system comprising:
    (a) a downhole assembly comprising a sensor, wherein said downhole assembly is terminated at a lower end by a drill bit and at an upper end by a drill string operationally attached to a drilling rig;
    (b) an electromagnetic telemetry system for transmitting an electromagnetic signal indicative of a response of said sensor, said telemetry system comprising
        (i) a surface EM transceiver for receiving said signal,
        (ii) a borehole EM transceiver for transmitting said signal wherein said borehole EM transceiver is disposed within said downhole assembly and operationally connected to said sensor, and
        (iii) a signal wire with a first end comprising electrode means connected within said borehole to the outer surface of a casing string, and a second end electrically connected to said surface EM transceiver; and (c) a processor cooperating with said surface EM transceiver by means of a link to convert said signal into said parameter of interest; wherein (d) said signal wire reduces attenuation of said signal transmitted between said surface EM transceiver and said borehole EM transceiver.

16. The measurement-while-drilling system of claim 15 further comprising a ground wire with a first end electrically connected to said surface EM transceiver and a second end connected to a ground point remote from said drilling rig.

17. The measurement-while-drilling system of claim 16 wherein said signal wire is disposed within an annulus defined by an outer surface of said casing string and the wall of said borehole.

18. The measurement-while-drilling system of claim 11 wherein said surface EM transceiver is positioned above earth surface through which said borehole penetrates.

19. The measurement-while-drilling system of clam 17 wherein:
(a) earth surface through which said borehole penetrates is covered by a body of water;
(b) said casing sting extends above a surface of said body of water;
(c) said borehole EM transceiver is disposed above said earth surface and within said body of water; and
(d) said processor is disposed above said surface of said water.

20. The measurement-while-drilling system of claim 17 wherein:
(a) earth surface through which said borehole penetrates is covered by a body of water;
(b) said casing extends above a surface of said body of water; and
(c) said borehole EM transceiver is disposed above said surface of water.

21. The measurement-while-drilling system of claim 15 wherein said first end of said signal wire is affixed to an electrode structure which is electrically insulated from said casing string by a non-conducting section of casing.

22. The measurement-whiled-drilling system of claim 15 comprising a second signal wire with a first end composing electrode means axially spaced in said borehole from said first end of said signal wire and a second end electrically connected to said surface EM transceiver, wherein said signal wire and said second signal wire cooperate to reduce surface noise in said signal.

23. The measurement-while-drilling system of claim 22 wherein said signal wire and said second signal wire are disposed within an annulus defined by an outer surface of said casing string and the wall of said borehole.

24. The measurement-while-drilling system of claim 23 wherein said surface EM transceiver is disposed within said annulus.

25. The measurement-while-drilling system of claim 23 wherein said surface EM transceiver is positioned above earth surface through which said borehole penetrates.

26. A method for transmitting an electromagnetic signal within a borehole, the method comprising:
(a) providing a borehole EM transceiver;
(b) providing a surface EM transceiver; and
(c) reducing attenuation of said signal transmitted between said borehole EM transceiver and said surface EM transceiver by connecting a first end of a signal wire within said borehole to the outer surface of a tubular, and electrically connecting a second end of said signal wire to a terminal of said surface EM transceiver.

27. The method of claim 26 further comprising the additional steps of:
(a) electrically connecting a first end of a ground wire to said surface EM transceiver; and
(b) electrically connecting a second end of said ground wire to a ground point remote from said surface EM transceiver.

28. The method of claim 27 comprising the additional step of disposing said signal wire in the annulus defined by an outer surface of the tubular and the wall of said borehole.

29. The method of claim 27 comprising the additional step of connecting said first end of said signal wire near the lower end of said tubular.

30. The method system of claim 27 where said first end of said signal wire is electrically connected to the outer surface of said tubular.

31. The method of claim 27 where said first end of said signal wire is mechanically connected to the outer surface of said tubular.

32. The method of cam 28 where said surface EM transceiver is positioned above ear surface through which said borehole penetrates.

33. The method of claim 28 wherein:
(a) earth surface through which said borehole penetrates is covered by a body of water;
(b) said tubular extends above a surface of said body of water; and
(c) said borehole EM transceiver is disposed above said earth surface and within said body of water.

34. The method of claim 28 wherein:
(a) earth surface through which said borehole penetrates is covered by a body of water;
(b) said tubular extends above a surface of said body of water; and
(c) said borehole EM transceiver is disposed above said surface of water.

35. The method of claim 26 comprising the additional step of affixing said first end of said signal wire to an electrode structure that is electrically insulated from said tubular by a non-conducting section of tubular.

36. The method of claim 26 comprising the additional step of reducing surface noise in said signal by providing a second signal wire with a first end disposed within said borehole axially spaced from said first end of said signal wire and a second end electrically connected to said surface EM transceiver, wherein said signal wire and said second signal wire cooperate to reduce said surface noise.

37. The method of claim 36 comprising the additional step of disposing said signal wire and said second signal wire within an annulus defined by an outer surface of said tubular and a wall of said borehole.

38. The method of claim 37 comprising the additional step of disposing said surface EM transceiver within said annulus.

39. The method of claim 37 wherein said surface EM transceiver is positioned above earth surface through which said borehole penetrates.

40. A method for measuring a parameter of interest while drilling a borehole, said method comprising:
(a) providing a downhole assembly comprising a sensor;
(b) terminating said downhole assembly at lower end with a drill bit and at an upper end by a drill string operationally attached to a drilling rig;
(c) advancing said borehole with said drill bit by rotating motion imparted to said bit;

(d) providing an electromagnetic telemetry system for transmitting an electromagnetic signal indicative of a response of said sensor, said telemetry system comprising
  (i) a surface EM transceiver for receiving said signal,
  (ii) a borehole EM transceiver for transmitting said signal wherein said borehole EM transceiver is disposed within said downhole assembly and operationally connected to said sensor, and
  (iii) a signal wire with a first end connected within said borehole to the outer surface of a casing string, and a second end electrically connected to a terminal of said surface EM transceiver;
(e) reducing attenuation of said signal transmitted between said surface EM transceiver and said borehole EM transceiver by use of said signal wire; and
(f) converting said signal to said parameter of interest with a processor cooperating with said surface EM transceiver by means of a link.

41. The method of clam 40 further comprising the steps of:
  (a) electrically connecting a first end of a ground wire to said surface EM transceiver; and
  (b) electrically connecting a second end of said ground wire to a ground point remote from said drilling rig.

42. The method of claim 41 comprising the additional step of disposing said signal wire within an annulus defined by an outer surface of said casing string and a wall of said borehole.

43. The method of claim 42 wherein said surface EM transceiver is positioned above earth surface through which said borehole penetrates.

44. The method of claim 42 wherein:
  (a) earth surface through which said borehole penetrates is covered by a body of water;
  (b) said casing string extends above a surface of said body of water;
  (c) said borehole EM transceiver is disposed above said earth surface and within said body of water; and
  (d) said processor is disposed above said surface of said water.

45. The method of claim 42 wherein:
  (a) earth surface through which said borehole penetrates is covered by a body of water;
  (b) said casing string extends above a surface of said body of water; and
  (c) said borehole EM transceiver is disposed above said surface of water.

46. The method of claim 40 comprising the additional step of affixing said first end of said signal wire to an electrode structure that is electrically insulated from said casing string by a non-conducting section of casing.

47. The method of claim 40 comprising reducing surface noise in said signal by:
  (a) providing a second signal wire;
  (b) disposing a first end of said second signal wire within said borehole at a location axially spaced from said first end of said signal wire; and
  (c) electrically connecting a second end of said second signal wire to a second terminal of said surface EM transceiver, wherein said signal wire and said second signal wire cooperate to reduce said surface noise in said signal.

48. The method of claim 47 comprising the additional step of disposing said signal wire and said second signal wire within an annulus defined by an outer surface of said casing string and a wall of said borehole.

49. The method of claim 48 comprising the additional step of disposing said surface EM transceiver within said annulus.

50. The method of claim 48 wherein said surface EM transceiver is positioned above earth surface through which said borehole penetrates.

51. The method of claim 40 comprising the additional step of transmitting a command to said downhole assembly by:
  (a) generating a command signal indicative of said command by means of input into said processor;
  (b) transferring said command signal to said surface EM transceiver via said link;
  (c) transmitting said command signal with said surface EM transceiver; and
  (d) receiving said command signal with said borehole EM transceiver.

* * * * *